United States Patent
Kim et al.

(10) Patent No.: US 8,781,714 B2
(45) Date of Patent: Jul. 15, 2014

(54) APPARATUS AND METHOD FOR CONTROLLING ENGINE RESTARTING OF VEHICLE

(75) Inventors: Sejun Kim, Seoul (KR); Chongah Gwon, Hwaseong-si (KR); Jiyong Yu, Pocheon-si (KR); Junghwan Bang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 516 days.

(21) Appl. No.: 13/211,992

(22) Filed: Aug. 17, 2011

(65) Prior Publication Data
US 2012/0136558 A1    May 31, 2012

(30) Foreign Application Priority Data
Nov. 30, 2010    (KR) .................. 10-2010-0120792

(51) Int. Cl.
- G06F 19/00 (2011.01)
- G06G 7/70 (2006.01)
- B60D 1/28 (2006.01)
- B60K 28/00 (2006.01)
- B60L 3/00 (2006.01)
- B60K 28/10 (2006.01)

(52) U.S. Cl.
CPC ...................................... B60K 28/10 (2013.01)
USPC ........... 701/113; 180/271; 340/904; 340/938; 340/944; 340/426.11; 123/179.3; 123/179.4

(58) Field of Classification Search
CPC . F02N 11/08; F02N 11/0814; F02N 11/0818; F02N 11/106
USPC ........ 307/10.3, 10.6; 180/271, 65.28, 65.285; 701/96, 112, 113; 340/903, 938, 944, 340/426.11, 463; 123/179.3, 179.4
See application file for complete search history.

(56) References Cited

U.S. PATENT DOCUMENTS

| | | | | |
|---|---|---|---|---|
| 3,154,168 | A * | 10/1964 | Wilmot | 180/279 |
| 5,377,641 | A * | 1/1995 | Salazar | 123/179.4 |
| 6,351,703 | B1 * | 2/2002 | Avery, Jr. | 701/112 |
| 6,629,515 | B1 | 10/2003 | Yamamoto et al. | |
| 7,091,629 | B2 * | 8/2006 | Hawkins | 307/10.6 |
| 7,212,906 | B2 | 5/2007 | Arai et al | |
| 7,281,595 | B2 * | 10/2007 | Bissontz | 180/65.28 |

(Continued)

FOREIGN PATENT DOCUMENTS

| | | |
|---|---|---|
| JP | 2003-201881 A | 7/2003 |
| JP | 2005-231491 A | 9/2005 |
| JP | 2006-112259 A | 4/2006 |
| JP | 2010-116871 A | 5/2010 |

*Primary Examiner* — Hieu T Vo
*Assistant Examiner* — Sherman Manley
(74) *Attorney, Agent, or Firm* — Morgan, Lewis & Bockius LLP

(57) ABSTRACT

An apparatus and a method for controlling engine restarting of a vehicle includes a hood opening recognition switch automatically on when a hood of the vehicle is opened and outputting a hood opening recognition signal; a front sensor installed on the front of the vehicle and outputting a sensing signal by sensing an object positioned with a predetermined distance in front of the vehicle; a determination unit verifying whether at least one of the hood opening recognition signal and the sensing signal is inputted in the state where an engine of the vehicle is off; and a setting unit setting a lock of restarting of the engine when it is verified that at least one of the hood opening recognition signal and the sensing signal is inputted.

12 Claims, 5 Drawing Sheets

(56) References Cited

U.S. PATENT DOCUMENTS

| | | | |
|---|---|---|---|
| 7,725,246 B2 * | 5/2010 | Abendroth et al. | 701/113 |
| 7,890,243 B2 * | 2/2011 | Abendroth | 701/112 |
| 2010/0253491 A1 * | 10/2010 | Grossman | 340/426.11 |

* cited by examiner

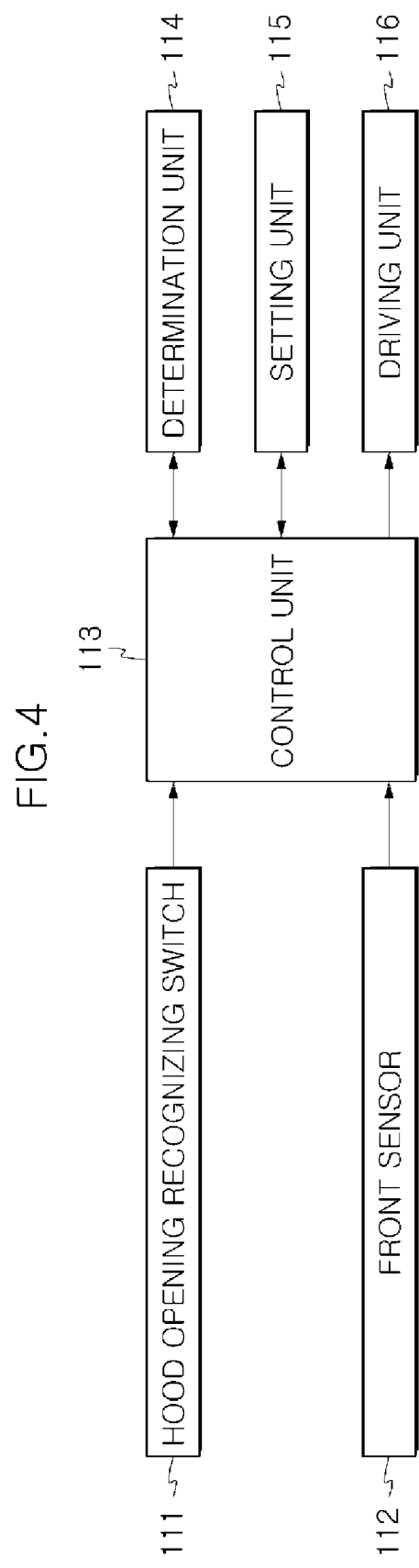

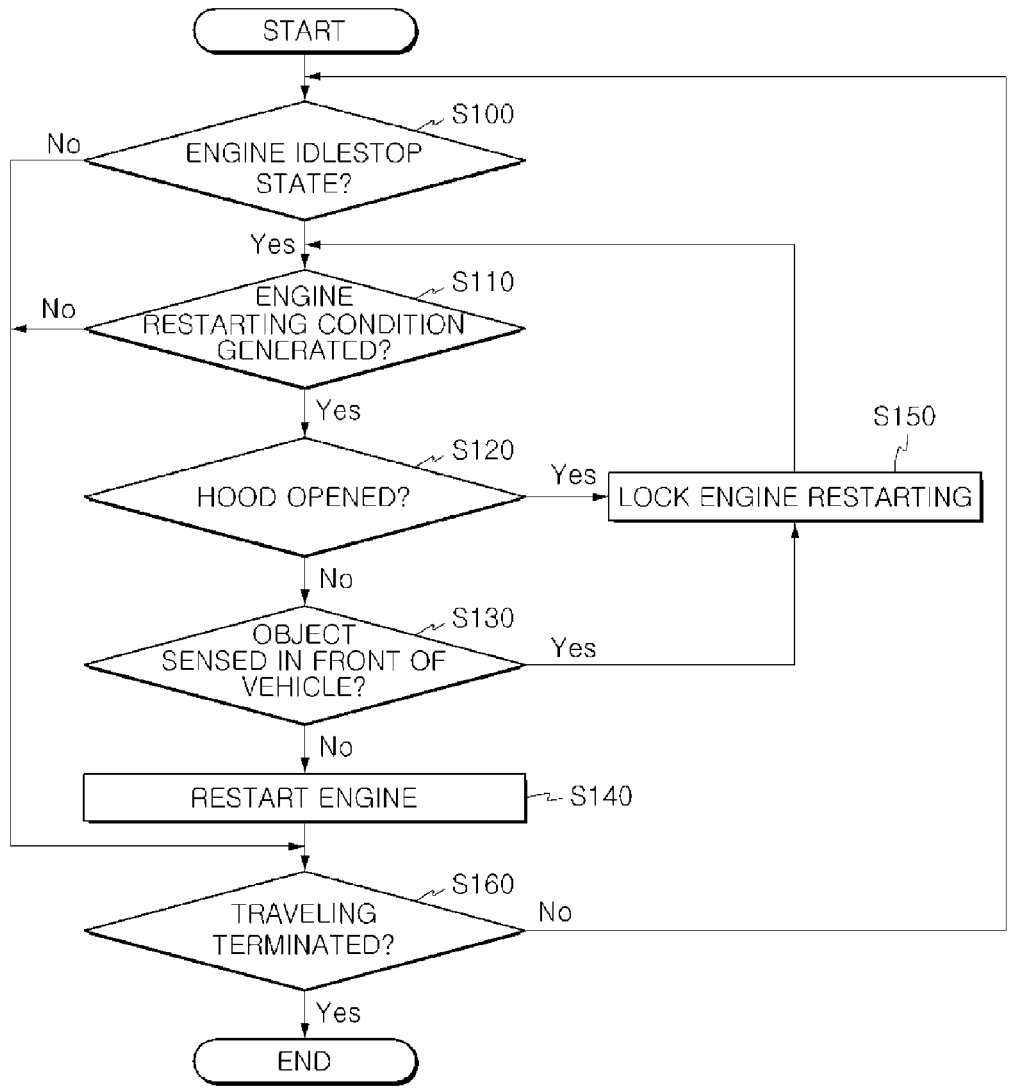

APPARATUS AND METHOD FOR CONTROLLING ENGINE RESTARTING OF VEHICLE

CROSS-REFERENCE TO RELATED APPLICATIONS

The present application claims priority to Korean Patent Application Number 10-2010-0120792 filed Nov. 30, 2010, the entire contents of which application is incorporated herein for all purposes by this reference.

BACKGROUND OF INVENTION

1. Field of Invention

The present invention relates to an apparatus and a method for controlling engine restarting of an ISG based vehicle, and more particularly, to an apparatus and a method for controlling engine restarting of a vehicle limiting engine restarting according to an opening state of a hood of the vehicle and sensing an object in front of the vehicle.

2. Description of Related Art

In general, an ISG based vehicle can automatically control starting an engine to suit system's requirements regardless of driver's will.

Of course, when the engine is restarted while working by opening a hood for maintenance in front of the vehicle, danger may occur. Therefore, a switch capable of recognizing an opening state of the hood is installed in a corresponding vehicle against the danger occurrence and the opening state of the hood is recognized according to operating the switch to prevent restating of the vehicle.

However, the vehicle restating preventing operation in the prior art can be made only in the state where opening of the hood is recognized by operating the switch on the front of the vehicle. In other words, when the work is performed while not opening the hood on the front of the vehicle or another object is positioned in front of the vehicle, the vehicle automatically controls engine starting irrespective of a front state of the vehicle.

In this case, when the engine is restarted while a human or an object is positioned in front of the vehicle, a dangerous situation may occur. In addition, when the switch on the front of the vehicle is defective, the opening of the hood is not recognized in spite of the opening of the hood, and as a result, the dangerous situation by engine restarting may occur likewise.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an apparatus and a method for controlling engine restarting of a vehicle in which engine restarting is locked by operating a switch enabling an opening state of a hood in the front of the vehicle to be recognized or by sensing an object in front of the vehicle through operation of a sensor installed on the front of the vehicle so as to solve a problem in dangerous accident by engine restarting.

Various aspects of the present invention provide for an apparatus for controlling engine restarting of a vehicle, which comprises a hood opening recognition switch automatically on when a hood of the vehicle is opened and outputting a hood opening recognizing signal, a front sensor installed on the front of the vehicle and outputting a sensing signal by sensing an object positioned with a predetermined distance in front of the vehicle, a determination unit verifying whether at least one of the hood opening recognizing signal and the sensing signal is inputted in the state where an engine of the vehicle is off, and a setting unit setting a lock of restarting of the engine when it is verified that at least one of the hood opening recognizing signal and the sensing signal is inputted.

The determination unit may determine whether an engine restarting condition is generated in the state where the engine is off.

The determination unit may verify whether at least one of the hood opening recognizing signal and the sensing signal is inputted for a predetermined time when the engine restarting condition is generated in the state where the engine is off.

The apparatus may further include a driving unit restarting the engine when the hood opening recognizing signal and the sensing signal is not inputted for a predetermined time in the case where the engine restarting condition is generated in the state where the engine is off.

The setting unit may unlock engine restarting when the hood opening recognizing signal and the sensing signal is not inputted for a predetermined time in the state where engine restarting is locked.

Other aspects of the present invention provide for a method for controlling engine restarting of a vehicle, which comprises outputting a hood opening recognizing signal according to operating of a hood opening recognition switch when a hood of the vehicle is opened, outputting a sensing signal when an object positioned within a predetermined distance in front of the vehicle is sensed through a front sensor installed on the front of the vehicle, verifying whether at least one of the hood opening recognizing signal and the sensing signal is inputted in the state where an engine of the vehicle is off, and setting a lock of restarting of the engine when it is verified that at least one of the hood opening recognizing signal and the sensing signal is inputted.

The method may further include determining whether an engine restarting condition is generated in the state where the engine is off.

In the verifying, it may be verified whether at least one of the hood opening recognizing signal and the sensing signal is inputted for a predetermined time when the engine restarting condition is generated in the state where the engine is off.

The method may further include restarting the engine when the hood opening recognizing signal and the sensing signal is not inputted for a predetermined time in the case where the engine restarting condition is generated in the state where the engine is off.

The method may further include unlocking engine restarting when the hood opening recognizing signal and the sensing signal is not inputted for a predetermined time in the state where engine restarting is locked.

According to various embodiments of the present invention, engine restarting is locked by operating a switch enabling an opening state of a hood in the front of the vehicle to be recognized or by sensing an object in front of the vehicle through operation of a sensor installed on the front of the vehicle so as to solve a problem in dangerous accident by engine restarting.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a block diagram referenced to describe a configuration of an exemplary apparatus for controlling engine restarting of a vehicle according to the present invention.

FIG. 5 is a flowchart showing an operational flow associated with an exemplary method for controlling engine restarting of a vehicle according to the present invention.

Figure 1:
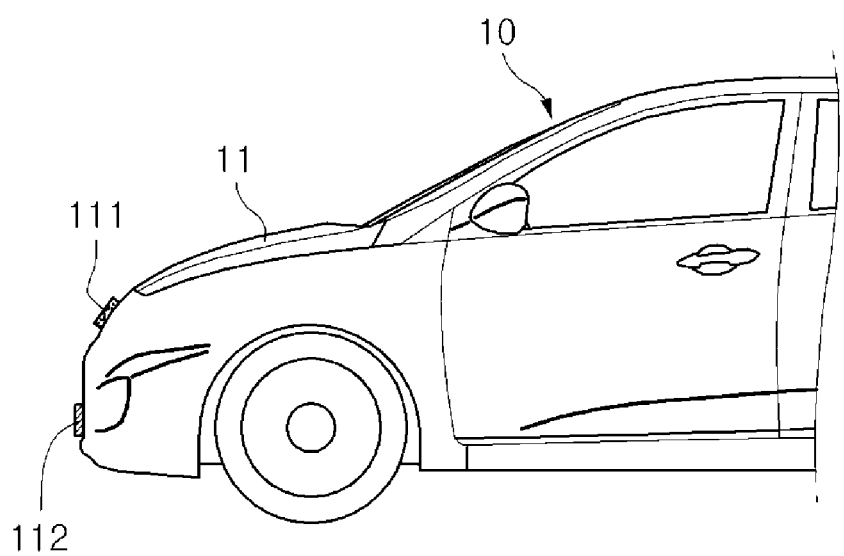
FIG. 1 is a diagram showing a vehicle adopting an exemplary apparatus for controlling engine restarting of a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an apparatus for controlling engine restarting of a vehicle according to various embodiments of the present invention controls restarting of an engine based on operating of a hood open recognition switch 111 for recognizing an opening state of a hood 11 of a vehicle 10 and sensing information from a front sensor 112. That is, the apparatus for controlling engine restarting according to various embodiments of the present invention is to control restarting of the engine by monitoring the operation of hood opening recognition switch 111 or an operation of front sensor 112 in the state where the engine of vehicle 10 is off (in idle stop).

In this case, hood opening recognition switch 111 is disposed on the front of vehicle 10. Hood opening recognition switch 111 may be automatically operated when hood 11 is opened and may also be manually operated by a user.

Front sensor 112 is installed on the front of vehicle 10 to sense an object positioned in front of vehicle 10. In this case, front sensor 112 as a proximity sensor using ultrasonic waves, a laser, and the like senses a corresponding object through a signal reflected from an object positioned within a predetermined distance in front of vehicle 10.

In this case, as front sensor 112, one sensor may be installed on the front of vehicle 10, but a plurality of sensors may be installed and the number of front sensors 112 is variously applicable for the various embodiments.

Figure 2:
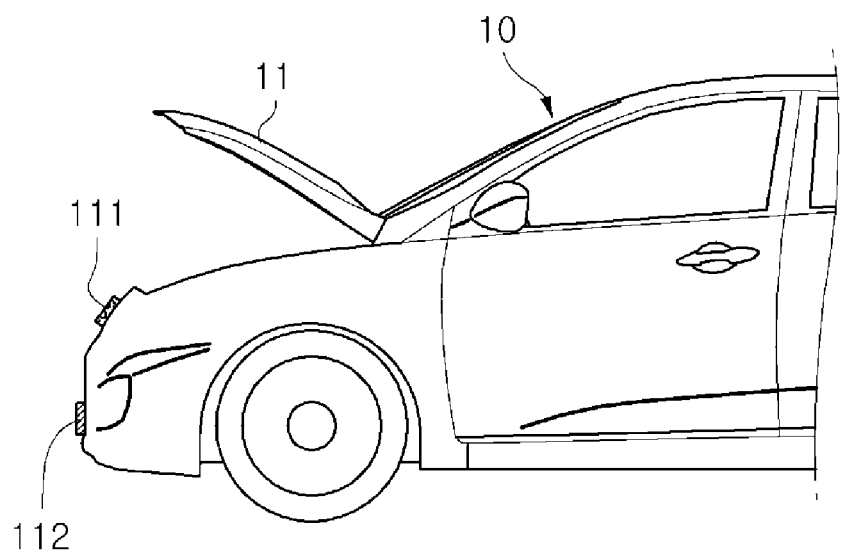
FIGS. 2 and 3 are illustrative diagrams referenced to describe an operation of an exemplary apparatus for controlling engine restarting of a vehicle according to the present invention.

FIG. 2 shows an operation of recognizing an opening state of a hood by operating a switch when a hood of a vehicle is opened. When hood 11 of vehicle 10 is opened, the switch connected to hood 11 is automatically operated when hood 11 is opened. Of course, hood opening recognition switch 111 may be manually operated by the user when hood 11 is opened, but preferably, it is automatically operated.

As such, when hood opening recognition switch 111 is operated by the opening of the hood 11, a signal enabling the opening of hood 11 to be recognized is automatically generated by operating hood opening recognition switch 111. The apparatus for controlling engine restarting according to various embodiments of the present invention recognizes the opening state of hood 11 through the signal generated at that time.

Figure 3:
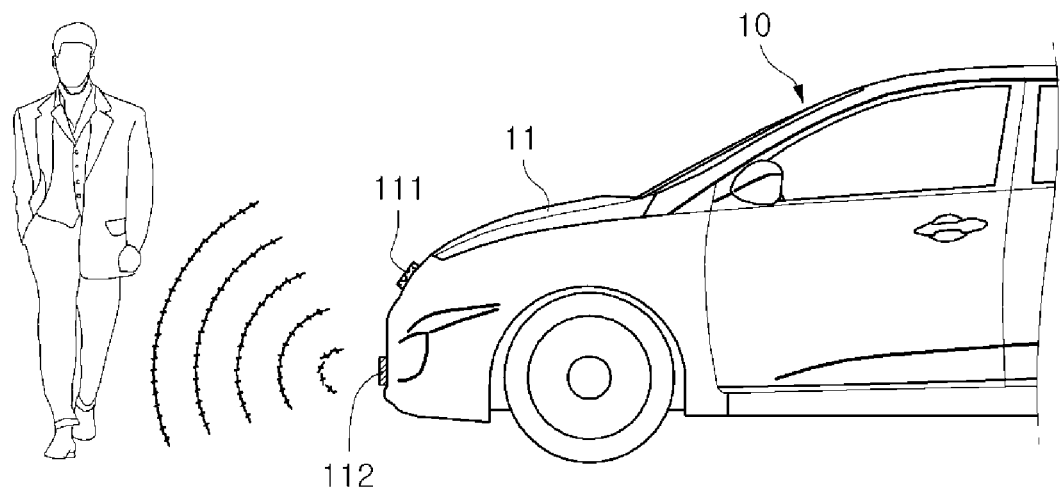

FIG. 3 shows an operation of sensing an object in front of a vehicle according to an operation of a front sensor disposed on the front of the vehicle. Front sensor 112 transmits the signal such as ultrasonic waves or laser and in this case, senses that an object is present within a predetermined distance in front of vehicle 10 through the signal reflected from the object positioned in front of vehicle 10.

In FIG. 3, front sensor 112 senses the object in front of vehicle 10 in the state where hood 11 is closed, but front sensor 112 senses the object in front of vehicle 10 even in the state where hood 11 is opened.

As a result, the apparatus for controlling engine restarting according to various embodiments of the present invention may control engine restarting according to sensing of the object in front of vehicle 10 when an engine restarting condition is generated in the state where hood 11 is closed or even if the engine restarting condition is generated in the state where hood 11 is opened, but hood opening recognition switch 111 is defective.

FIG. 4 is a block diagram referenced to describe a configuration of an apparatus for controlling engine restarting of a vehicle according to various embodiments of the present invention. The apparatus for controlling engine restarting according to various embodiments of the present invention includes a hood opening recognition switch 111, a front sensor 112, a control unit 113, a determination unit 114, a setting unit 115, and a driving unit 116. Control unit 113 controls an operation of each of the components of the apparatus for controlling engine restarting.

Hood opening recognition switch 111 is disposed on the front of a vehicle 10 and automatically operated according to opening of hood 11 as shown in FIGS. 1 to 3. That is, hood opening recognition switch 111 is off in the state where hood 11 is closed and automatically on when hood 11 is opened to output a hood opening recognition signal to control unit 113.

Of course, in the case where hood opening recognition switch 111 is implemented to be manually operated by a user, when hood opening recognition switch 111 is operated by the user at the time of opening hood 11, hood opening recognition switch 111 is on to output the hood opening recognition signal to control unit 113.

Front sensor 112 is installed on the front of vehicle 10 to sense the object in front of vehicle 10 as shown in FIGS. 1 to 3. That is, front sensor 112 transmits a signal such as ultraviolet waves or a laser to the front of vehicle 10 like the illustrated exemplary embodiment shown in FIG. 2. In this case, front sensor 112 senses the object through the signal reflected from the object positioned within a predetermined distance in front of vehicle 10.

Front sensor 112 operates regardless of an opening state of hood 11 and when front sensor 112 senses the object in front of vehicle 10, it outputs a sensing signal to control unit 113.

Determination unit 114 verifies whether at least one of the hood opening recognition signal and the sensing signal is inputted when an engine of vehicle 10 is off.

Further, determination unit 114 verifies whether an engine restarting condition is generated when the engine of vehicle 10 is off. In this case, determination unit 114 verifies whether at least one of the hood opening recognition signal and the sensing signal is inputted when the engine restarting condition is generated.

Setting unit 115 sets a lock so as to prevent the engine from being restarted when it is verified that at least one of the hood opening recognition signal and the sensing signal is inputted when the engine of vehicle 10 is off. Even though the engine restarting condition is generated when engine restarting is locked by setting unit 115, engine restarting is stopped.

Setting unit 115 may unlock engine restarting when at least one of the hood opening recognition signal and the sensing signal is not inputted for a predetermined time or more in the state where engine restarting is locked.

Control unit 113 outputs a control signal to driving unit 116 when the engine restarting condition is generated in the state where engine restarting is not locked. In this case, driving unit 116 restarts the engine according to the control signal from control unit 113.

FIG. 5 is a flowchart showing an operational flow associated with a method for controlling engine restarting of a vehicle. The apparatus for controlling engine restarting according to various embodiments of the present invention verifies whether the engine is in idle stop state (the engine is off) (S100). When the engine is in idle stop state, the apparatus for controlling engine restarting verifies whether the engine restarting condition is generated (S110).

When the engine restarting condition is generated, the apparatus for controlling engine restarting verifies an opening state of hood 11 and a front state of corresponding vehicle 10.

In other words, the apparatus for controlling engine restarting verifies whether the hood opening recognition signal is inputted according to the operating of hood opening recognition switch 111 and when the hood opening recognition signal is inputted (S120), the apparatus for controlling engine restarting determines that hood 11 is opened to lock engine restarting (S150).

Further, the apparatus for controlling engine restarting verifies whether the sensing signal is inputted from front sensor 112 and when the sensing signal is inputted (S130), the apparatus for controlling engine restarting determines that the object is sensed in front of vehicle 10 to lock engine restarting (S150).

Of course, although not shown in FIG. 5, when at least one of the hood opening recognition signal and the sensing signal is inputted even though the engine restarting condition is not generated, the apparatus for controlling engine restarting may lock engine restarting.

In this case, since the apparatus for controlling engine restarting locks engine restarting even though the engine restarting condition is generated, the apparatus for controlling engine restarting stops engine restarting. In this case, the apparatus for controlling engine restarting may unlock engine restarting when the hood opening recognition signal and the sensing signal are not inputted for a predetermined time.

Meanwhile, the apparatus for controlling engine restarting determines that no object is sensed in front of vehicle 10 to restart the engine when the hood opening recognition signal and the sensing signal are not inputted in the state where the engine restarting condition is generated.

Steps 'S100' to 'S150' are repetitively performed until a travelling termination command is inputted and when the travelling termination command is inputted (S160), they are terminated.

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling engine restarting of an auto-start engine of a vehicle, the apparatus comprising:
    a hood opening recognition switch automatically on when a hood of the vehicle is opened and outputting a hood opening recognition signal;
    a front sensor installed on a front of the vehicle and outputting a sensing signal by sensing an object positioned with a predetermined distance in front of the vehicle;
    a determination unit verifying whether the hood opening recognition signal and/or the sensing signal is inputted in the state where an engine of the vehicle is off; and
    a setting unit setting a lock of restarting of the engine when it is verified that at least one of the hood opening recognition signal and the sensing signal is received by the setting unit.

2. The apparatus as defined in claim 1, wherein the determination unit determines whether an engine restarting condition is generated in the state where the engine is off.

3. The apparatus as defined in claim 2, wherein the determination unit verifies whether at least one of the hood opening recognition signal and the sensing signal is inputted for a predetermined time when the engine restarting condition is generated in the state where the engine is off.

4. The apparatus as defined in claim 3, further comprising a driving unit restarting the engine when the hood opening recognition signal and the sensing signal is not inputted for a predetermined time in the case where the engine restarting condition is generated in the state where the engine is off.

5. The apparatus as defined in claim 1, wherein the setting unit unlocks engine restarting when the hood opening recognition signal and the sensing signal is not inputted for a predetermined time in the state where engine restarting is locked.

6. A method for controlling engine restarting of an auto-start engine of a vehicle, the method comprising:
    outputting a hood opening recognition signal according to operating of a hood opening recognition switch when a hood of the vehicle is opened;
    outputting a sensing signal when an object positioned within a predetermined distance in front of the vehicle is sensed through a front sensor installed on a front of the vehicle;

verifying whether the hood opening recognition signal and/or the sensing signal is inputted in the state where an engine of the vehicle is off; and setting a lock of restarting of the engine when it is verified that at least one of the hood opening recognition signal and the sensing signal is received.

7. The method as defined in claim 6, further comprising determining whether an engine restarting condition is generated in the state where the engine is off.

8. The method as defined in claim 7, wherein in the verifying, it is verified whether at least one of the hood opening recognition signal and the sensing signal is inputted for a predetermined time when the engine restarting condition is generated in the state where the engine is off.

9. The method as defined in claim 8, further comprising restarting the engine when hood opening recognition signal and the sensing signal is not inputted for a predetermined time in the case where the engine restarting condition is generated in the state where the engine is off.

10. The method as defined in claim 8, further comprising unlocking engine restarting when the hood opening recognition signal and the sensing signal is not inputted for a predetermined time in the state where engine restarting is locked.

11. A vehicle including the apparatus for controlling engine restarting according to claim 1.

12. A vehicle including the method for controlling engine restarting according to claim 6.

\* \* \* \* \*